No. 875,381. PATENTED DEC. 31, 1907.
G. M. RICE.
PROCESS OF TREATING COMPLEX ORES CONTAINING ZINC AND OTHER VOLATILIZABLE METALS.
APPLICATION FILED FEB. 25, 1907.
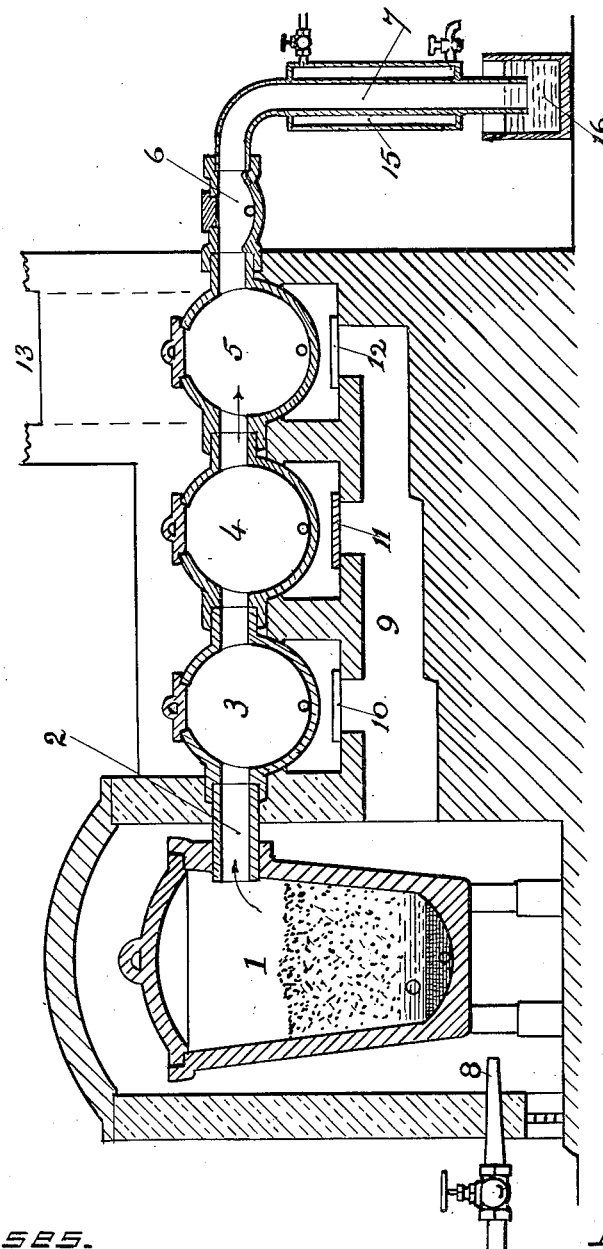
Witnesses.
Ella P. Blenus.
A. A. Phentan
Inventor.
George M. Rice,
By Chas. H. Burleigh,
Attorney.

UNITED STATES PATENT OFFICE.

GEORGE M. RICE, OF WORCESTER, MASSACHUSETTS.

PROCESS OF TREATING COMPLEX ORES CONTAINING ZINC AND OTHER VOLATILIZABLE METALS.

No. 875,381.

Specification of Letters Patent.

Patented Dec. 31, 1907.

Application filed February 25, 1907. Serial No. 359,089.

*To all whom it may concern:*

Be it known that I, GEORGE M. RICE, a citizen of the United States, residing at Worcester, in the county of Worcester and State of Massachusetts, have invented a new and useful Process of Treating Complex Ores Containing Zinc and other Volatilizable Metals, of which the following is a specification, reference being made therein to the accompanying drawings.

The object of my present invention is to afford a ready means for extracting volatile metals, as for instance zinc, or other metals of a like volatile nature, from their sulfid ores in their raw state, and without a previous roasting or other oxidizing process; also to save certain rare metals ordinarily lost by other processes.

Another object is to provide a method of recovering zinc and other metals of volatilizable nature from their sulfid ores, taken in their raw state without previous roasting or oxidizing, and to save certain non-volatile metals and the sulfur in the form of matte produced in the operation in treating complex or other zinc ores.

The ores submitted to the process may be any complex mixtures, as for instance ore carrying the sulfids of zinc, cadmium, mercury, iron, lead, copper, gold, silver, or other metals in greater or less amounts. I find that any or all of the volatile metals contained in such ores can be saved by proper manipulation of the process, while the non-volatile metals, as well as the sulfur contained in the ore mixture, are concentrated in a matte for further utilization.

In carrying out my present process the raw ores are first crushed to about twenty mesh, more or less, or finer if desired. I then mix with the crushed raw ore finely divided metallic iron, as for instance the drillings or chips produced by iron working machines of various kinds. The quantity of iron mixed with the ore must be in large excess of the quantity necessary to chemically combine with the sulfur from the volatilizable metals in forming mono-sulfid of iron, (FeS.) and also an additional amount sufficient to saturate and form a slag with what silica the ore may contain; say for complex ores carrying forty parts zinc, about fifty per cent. of their weight of added iron is necessary to easily reduce and volatilize the zinc, and other metals of like nature; but it may be more or less in quantity in case of different ores, as may be found necessary to decompose the ore mixture and liberate the metals; but in all cases the added iron must chemically overbalance or be in excess of the requirements of the sulfur and silica. Such large per cent. of excess iron has been found to completely free the volatile metals so that they will not be carried into the matte, in part, and thus form a troublesome mixture for after treatment.

The iron employed may be ordinary machine shop waste, chips and filings, borings and turnings; the material known as "iron sponge" comminuted; or iron in any equivalent granular form. This ore and iron mixture is placed in a crucible, or closed retort, of any suitable form capable of being heated by external means, as by an inclosing furnace, or by a current of electricity, or by other means. The retort is connected with a condensing apparatus, which may be constructed as more fully hereinafter described.

The retort or crucible is closed, except for the leader to the condenser, and luted so as to keep out external air and avoid the forming of oxids of the metals while undergoing treatment. After the retort is charged with the ore and iron mixture and closed, heat is applied in the manner above indicated and maintained at such temperature as may be necessary to liberate the metal, or metals, capable of being volatilized out of the ore, and the heating continued until they are driven off and the non-volatile metals have melted and united in the matte that is formed by union of the added iron and the sulfur present in the ore; which product, together with the slag, is then in condition to be discharged from the retort while still in a fused condition.

It will be understood that no carbon or reducing agent other than the iron is required, nor is anything added to the ore mixture for the liberating of the volatile metals while undergoing the process, the iron chips or drillings acting both as a decomposing and as a reducing agent to free such metals. The iron also, together with the sulfur, acts as a carrier for gathering and concentrating the non-volatile metals into the matte produced within the retort or crucible.

In some instances silica or lime may be added to the mixture to form a slag; or slag from a previous operation may be added when a slag is deemed necessary to facilitate the working of some particular ores; but in most cases it is unnecessary to add slag forming material other than those already present in the ore.

The matte produced by this improved process is nearly neutral in its action on the walls of the retorts, it not having the firey, corrosive qualities possessed by matte that is produced in blast furnace practice; hence its destructive action on the retort or crucible employed is slight.

The condensing apparatus for receiving the metallic fumes or volatilized substances as they pass from the retort, crucible or furnace hearth, is preferably composed of a series of chambers or sections suitably connected with the interior of the retort or melting hearth or crucible chamber by a conduit or leader through which the volatile substances pass until reaching a temperature of condensation.

The different chambers or condensing sections are best maintained at different degrees of temperature, and the degree of temperature for the respective sections regulated or adapted for the particular kind of metal which the section is predetermined for condensing, the sections being graduated in their order, so that the more volatile metals will travel the farthest from the retort before condensing, and thus be gained in a purer condition than is possible when a single condensing section is used for all the metals. In this way certain rare metals, like indium, or gallium, for instance; or others of a similar nature, if present in the ore, would be found in the more remote sections of the condensing apparatus. The condensing sections may be cooled by external means if desired; particularly if iron tubing or the like is used for the more remote parts of it.

After the slag and matte are drawn off the retort is then recharged and the process steps gone through with as before; or the crucible can be provided with proper openings for entrance of the materials and discharge of the products, and the process thus made continuous instead of intermittent.

The accompanying drawing represents a sectional elevation diagram illustrating in a general way the order of arrangement of one form of apparatus which may be used in carrying out my process.

In said drawing the numeral 1 represents the crucible, retort, or furnace.

Numerals 3, 4, 5, 6 and 7 indicate the series of condensing sections or chambers connected by a leader 2 with the crucible; 8 indicates a nozzle for supplying a gas flame, or other means of heating; 9 indicates the flue leading from the furnace beneath the condensers; 10, 11 and 12 indicate means for regulating the temperature of the condensers; in the present instance by controlling dampers disposed in flues leading beneath the respective condensing sections into the stack 13.

15 indicates a cooler or refrigerating means for regulating the remote section or downward part 7 of the condensing means, and 16 a dip receptacle at the end of the condenser conduit. It will be understood that in practicing my invention this or any other preferred form of apparatus can be employed; since my invention relates to improvements in the process or mode of treatment, irrespective of any particular form of apparatus that may be used for working the same.

By the within described process of treating volatile metals, it is possible to utilize ores in their natural condition, and by this means gain metallic elements which are usually lost in the ordinary processes; furthermore, the gain of metal is more complete, avoiding the residual and other losses of the older processes. The yield approximates closely to that found by assay; while the capacity of the retorts is augmented by reason of the density of the ore mixture as compared with the former methods; and further it wholly avoids the roasting process hitherto necessary as a preliminary step in the treatment of such ores.

It will be understood that pure sulfur bearing ores of any volatile metal can be very readily treated in the manner indicated and the metallic contents realized from them in much less time than is required by former processes. In my process the non-volatile metals contained in the ores, such as copper, lead, gold, silver etc., are concentrated in the matte in a condition for any further treatment desired.

An additional advantage of the process is the almost complete recovery of the sulfur contained in the ore which is concentrated in the matte, and from which it can be utilized by various means for use in the arts.

I do not claim broadly the employment of metallic iron in the art of metallurgy irrespective of the manner in which it is employed; but my invention has reference to the use of it in the particular process and manner indicated, and for the purpose stated in my specification.

What I claim and desire to secure by Letters Patent, is—

1. In the art of reducing complex zinc ores direct from the raw ore, the process step which consists in supplying to the ore a quantity of finely divided metallic iron in large excess of the amount required to combine with the sulfur from the volatilizable metals in forming mono-sulfid of iron (FeS.) and an additional amount sufficient to form slag, with the silica contained in the ore during the melting operation.

2. The process of treating sulfid ores containing volatile metals, which consists in intimately mixing with such ores a quantity of finely divided metallic iron particles in an amount of about fifty per cent. of the weight of the ore, thereby to chemically overbalance the sulfur that is combined with such volatilizable metals, then subjecting the mass to a degree of heat sufficient to volatilize said metals and set them free, forming monosulfid of iron with the sulfur previously combined with the metal, or metals, volatilized out of the ore.

3. The improvement in treating zinc ores, which consists in adding to crushed raw zinc ore a quantity of finely divided metallic-iron chips in excess of the amount that can combine with the sulfur in the volatilizable metals, subjecting the mixture to heat in a suitable retort or furnace at a degree sufficient to drive off volatilized metals and melt the residual material to matte and slag, then condensing the volatilized metals in successively arranged chambers or sections, the temperatures of which are adjusted according to the condensing requirements of the respective metals.

4. In the process of treating complex ores containing volatilizable metals, the improvement which consists in volatilizing such metals in a closed crucible or retort, leading the vaporized product from said retort into a series of condensing chambers or sections, regulating the temperature of the respective sections each for the condensation of a predetermined kind of metal, and gathering and collecting the several metals in their respective sections.

5. The improvement in the process of recovering metal from complex ores containing zinc and rare volatilizable metals, as indium, gallium, or the like, which consists in melting the ore, together with an excess of metallic iron, and volatilizing contained metals in a suitable crucible or retort, carrying the fumes away from the fused product, and then condensing the volatilized metals, such as indium, gallium and similar metals, at a location separate from the zinc condensation.

6. In the process of treating ores containing volatilizable metals, the improvement which consists in fusing the ore and volatilizing the metals in admixture with an excess of metallic iron particles, and forming monosulfid of iron with the sulfur freed from the volatilized metals, and incorporating it in the matte produced.

Witness my hand this 23rd day of February, 1907.

GEORGE M. RICE.

Witnesses:
CHAS. H. BURLEIGH,
S. P. MORRIS.